United States Patent [19]

Cannistra

[11] Patent Number: 4,938,830
[45] Date of Patent: Jul. 3, 1990

[54] PLASTIC CARD AND METHOD OF FABRICATION THEREOF

[75] Inventor: Nick E. Cannistra, Addison, Ill.

[73] Assignee: Perfect Plastic Printing Corp., St. Charles, Ill.

[21] Appl. No.: 164,919

[22] Filed: Mar. 7, 1988

[51] Int. Cl.$^5$ ............................................. B32B 31/00
[52] U.S. Cl. ...................... 156/270; 40/626; 156/277; 156/280; 156/323; 283/75; 283/109; 524/110
[58] Field of Search ............... 156/270, 323, 280, 277; 524/110; 40/626; 283/75, 109

[56] References Cited

U.S. PATENT DOCUMENTS

| | | | |
|---|---|---|---|
| 3,809,568 | 5/1974 | Askew | 156/277 |
| 4,100,011 | 7/1978 | Foote | 156/277 |
| 4,477,608 | 10/1984 | Bäbler et al. | 252/512 |

Primary Examiner—John J. Gallagher
Attorney, Agent, or Firm—Joseph P. Gastel

[57] ABSTRACT

A method of fabricating a plastic card including the steps of printing on the rear surface thereof, laminating a sheet of clear plastic to the rear surface while simultaneously polishing the front surface, laminating a metal layer to the front surface of the sheet of plastic, and applying a protective coating of a mixture of aminocoumarin dye and clear liquid polyvinyl chloride to the surface by a silk screen process to thereby protect the metal layer against wear and abrasion. A plastic card including a central layer having a front surface and a rear surface, a layer of clear plastic sheeting on the rear surface, a metalized layer on the front surface, and a coating of cured silk-screen-applied clear liquid resin consisting of a mixture of aminocoumarin dye and clear liquid polyvinyl chloride on the metal layer for protecting it against wear and abrasion.

15 Claims, 1 Drawing Sheet

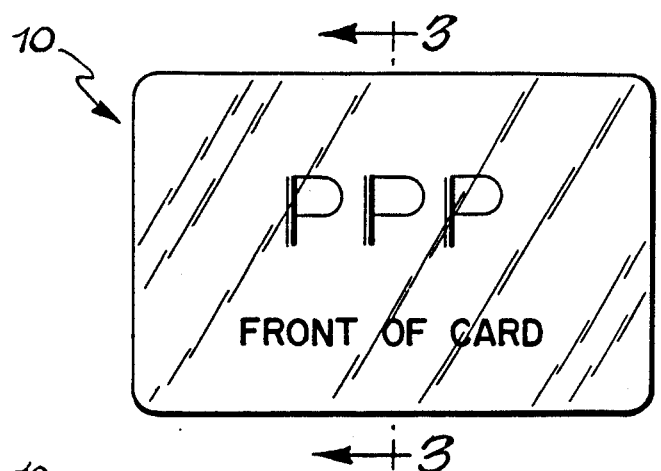
Fig. 1.
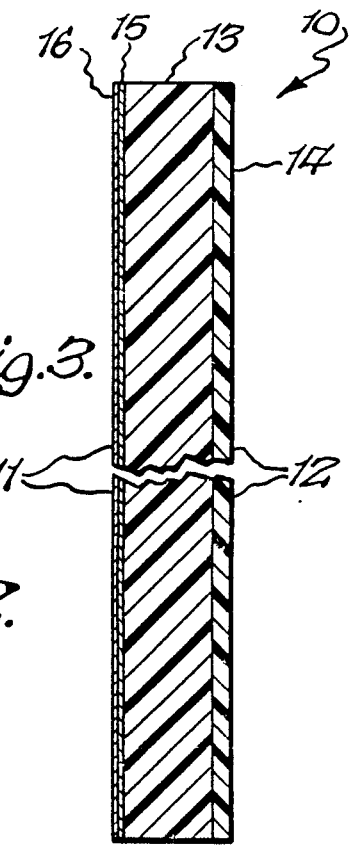
Fig. 3.
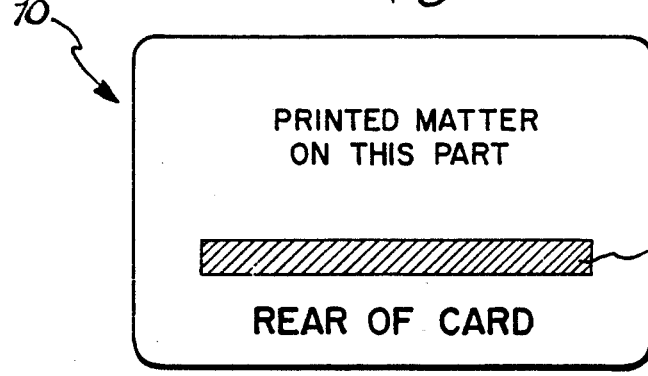
Fig. 2.
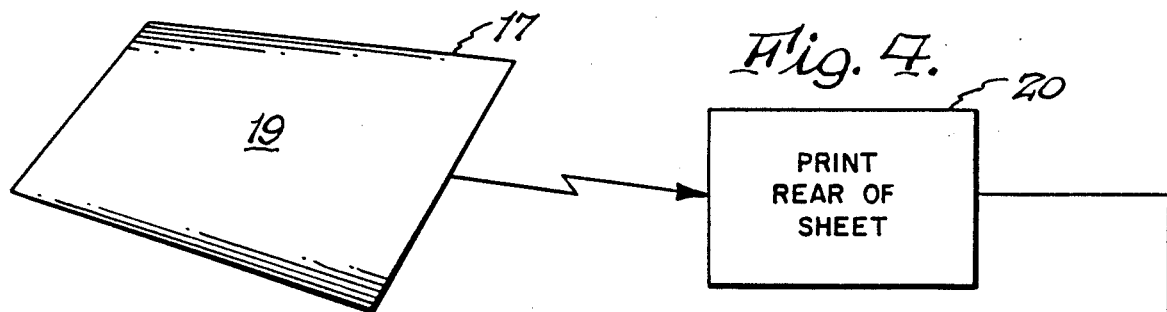
Fig. 4.
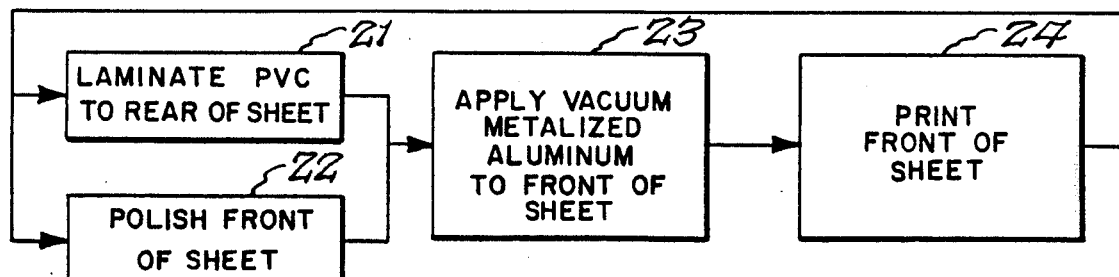
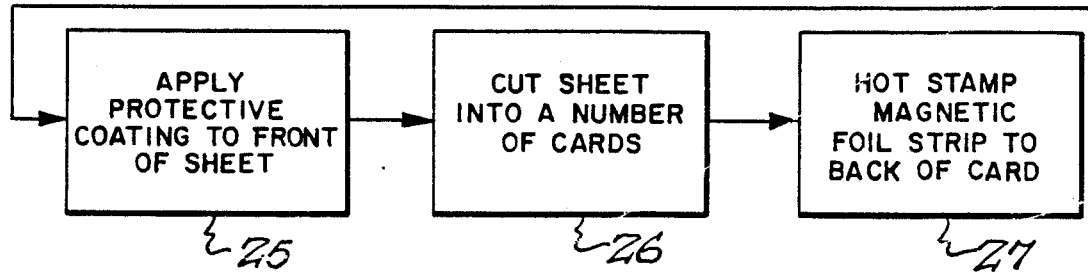

4,938,830

PLASTIC CARD AND METHOD OF FABRICATION THEREOF

BACKGROUND OF THE INVENTION

The present invention relates to an improved plastic card and a method of fabrication thereof.

By way of background, there are different types and styles of credit and charge cards made out of plastic. Recently cards of this type have been fabricated with a mirror-like finish. However, it has been difficult to protect this finish against deterioration resulting from abrasion and normal usage. The reason for this is that the conventional PVC clear layer which is normally applied to the surface of a plastic card will not adhere satisfactorily to the metalized aluminum.

SUMMARY OF THE INVENTION

It is accordingly one object of the present invention to provide an improved plastic card with a metalized surface which is protected from abrasion and wear so that it will retain its original luster throughout its useful life.

Another object of the present invention is to provide an improved method of fabricating a plastic card having a wear-resistant metal surface. Other objects and attendant advantages of the present invention will readily be perceived hereafter.

The present invention relates to a plastic card comprising a central layer of plastic having a front surface and a rear surface, a layer of clear plastic laminated to said rear surface, a metal sheet laminated to said front surface, and a protective coating of cured liquid resin on the surface of said vacuum metalized sheet, said liquid resin comprising a mixture of polyvinyl chloride and aminocoumarin dye.

The present invention also relates to a method of fabricating a plastic card comprising the steps of providing a sheet of plastic having a front surface and a rear surface, printing said rear surface of said sheet of plastic, laminating a sheet of clear plastic to said rear surface of said sheet of plastic, polishing said front surface of said sheet of plastic, laminating a metal layer to said front surface of said sheet of plastic to provide a shiny front surface to said sheet of plastic, printing the shiny surface of said metal layer, and applying a protective coating to said surface of said metal layer.

The present invention also relates to a method of fabricating a laminate comprising the steps of providing a sheet of plastic having a front surface and a rear surface, laminating a metal layer to one of said surfaces of said sheet of plastic to provide a shiny surface to said sheet of plastic, applying a protective coating of a mixture liquid polyvinyl chloride and aminocoumarin dye to said surface of said metal layer, and curing said protective coating.

The present invention also relates to a method of applying a mirrored surface to a plastic sheet comprising the steps of polishing the surface of said plastic sheet, adhering a metal layer to said surface, and applying a coating of a mixture of clear polyvinyl chloride ink and aminocoumarin dye to said metal layer, and curing said coating.

The present invention also relates to a protective coating comprising a mixture of liquid polyvinyl chloride and aminocoumarin dye.

The various aspects of the present invention will be more fully understood when the following portions of the specification are read in conjunction with the accompanying drawings wherein:

BRIEF DESCRIPTION OF THE DRAWINGS

FIG. 1 is a view of the front surface of the card of the present invention;

FIG. 2 is a view of the rear surface of the card of the present invention;

FIG. 3 is a fragmentary enlarged cross sectional view taken substantially along line 3—3 of FIG. 1; and FIG. 4 is a flow diagram depicting the steps performed in the fabrication of the card of FIGS. 1-3.

DESCRIPTION OF THE PREFERRED EMBODIMENTS

The improved plastic card 10 of the present invention has a front surface 11 and a rear surface 12. The card 10 is a laminate throughout its extent, and it includes a central layer 13 of 0.024 inch thick white polyvinyl chloride sheet (hereafter called PVC), a layer 14 of 0.005 inch thick clear PVC sheet, a layer 15 of vacuum metalized aluminum sheet approximately 0.0005 inches thick, and a cured coating 16 consisting of a mixture of aminocoumarin dye in clear polyvinyl chloride liquid which has been applied by a silk screen process.

The process of fabricating the card 10 includes the steps of providing a sheet 17 of 0.024 white PVC having a front surface 19 and a rear surface, not numbered. The process includes the step at 20 of printing the rear of the sheet preferably by offset lithography, but it could be printed by any other applicable process, such as letterpress or rotogravure printing. After the foregoing printing step has occurred, the steps at 21 and 22 are performed simultaneously. Step 21 comprises laminating a 0.005 inch clear PVC sheet to the rear of sheet 17. Simultaneously the front surface of the sheet 17 is polished to provide a smooth surface, thereby preparing it for receiving a layer of aluminum. The foregoing two steps are performed simultaneously in a laminator wherein the clear PVC is pressed against the rear surface of sheet 17. The front surface 19 is polished by applying a polishing metal plate against it with heat and pressure to compress the surface and make it more perfectly smooth. The foregoing is performed in a press at 1,000 pounds per square inch and at a temperature of approximately 290° F. The foregoing steps at 21 and 22 thus laminate the clear PVC to the rear surface of the sheet, compact sheet 17, and smooth the front surface 19 thereof.

The next step of the process at 23 is the application of vacuum metalized aluminum sheeting to the front surface 19 of the sheet 17. The aluminum is taken from a roll and rolled onto the front surface 19 of sheet 17 by a hot roller and it is thereafter pressed down in a press. The front surface 19 of sheet 17, as noted above, was previously polished so as to provide a smooth surface for receiving the aluminum. The pressing of the aluminum onto surface 19 is effected at approximately 80 pounds per square inch and at a temperature of approximately 400° F.

The next step 24 of the process is to print the front surface of the aluminum sheet with any desired script. This printing is effected by the silk screen method. The printing is with ultraviolet cured inks applied through a 355 screen mesh.

In accordance with the present invention, the next step of the process at 25 is the application of a protective coating to the front surface of the sheet. Normally the protective coating of conventional cards is 0.005 clear PVC sheeting, as was applied to the rear of the sheet 17 in step 21. However, it has been found that the clear PVC will not adhere satisfactorily to the vacuum metalized aluminum. In accordance with the present invention, a special protective coating is applied to the front surface 19 on top of the vacuum metalized aluminum by silk screening it through a 355 screen mesh and thereafter drying it conventionally by heating it at 180° F. for a period of about 20 seconds. The special protective coating which was actually used consists of a mixture of 0.01 ounces of 100% uncut aminocoumarin dye powder mixed with a gallon of clear polyvinyl chloride ink. However the aminocoumarin dye powder can be used in amounts which are plus or minus about 15% of the 0.01 ounces per gallon of polyvinyl chloride ink which was actually used, as noted above. An uncut aminocoumarin dye which has been used is known commercially under the trademark CALCOFLUOR of the American Cyanamid Co., and designated "CALCOFLUOR White RWP Conc." and "Fluorescent Brightening Agent 61." It's molecular formula is $C_{14}H_{17}O_2N$ with a molecular weight of 231 and a melting point of 69-73° C. A polyvinyl chloride clear ink which can be used is known commercially as Colonial Ink Co. 3900-99 Clear. The Colonial Ink Co. 3900-99 is a product consisting of polyvinyl chloride in a solvent base. It is a solution comprising, in addition to the polyvinyl chloride, xylene, n-nonane, trimethyl benzene, naphtalene, aromatic paraffins, isophorene, cyclohexanone, and methyl isobutyl ketone. It has a boiling range of 315-420° F. and an average weight of about 10.12 pounds per gallon and a flash point of about 74° F. Other polyvinyl chloride clear inks consisting of polyvinyl chloride in suitable conventional solvents can be used. The concentration of the polyvinyl chloride in the solvent merely determines the thickness of the protective coating, and thus different concentrations can be used depending on the desired results. Furthermore, the type and amount of solvent merely affects the curing time.

It has been found that applying the coating as described above in step 25 provides an outer surface 16 which visually appears as a lamination. The coating thus protects the front of the card while providing a clear very smooth surface which has no ripples or an orange peel look. This is unusual, especially considering that the application was through a silk screen. It is believed that the uniformity is obtained by a combination of applying the coating through the silk screen and thereafter curing it in the above manner which causes the coating to provide a smooth surface which does not have a matte look.

The protective coating 16 performs a plurality of functions. First of all, it permits the vacuum metalized aluminum surface to retain its mirror-like look by protecting it from abrasions and scuffing. Thus, the mirror-like effect on the front surface of the sheet will be preserved in use. In other words, the purpose of coating 16 is to prevent the diminishing of the clarity of the vacuum metalized aluminum by maintaining it in its original shiny condition. In addition, the coating applied in step 25 also protects the printing which was applied in step 24. The protective coating applied in step 25 also protects the vacuum metalized surface from destruction during subsequent embossing of the cards 10 which are subsequently cut from sheet 17. As is understood, the embossing is a process wherein raised letters and numbers are formed on the card 10 for identification of the user.

After the completion of step 25, step 26 is performed wherein sheet 17 is cut into a number of cards by a conventional slitting operation. Thereafter, in step 27, a magnetic foil strip 29 (FIG. 2) is hot-stamped onto the rear surface of the card for carrying magnetic identification data.

It thus can be seen that the improved card and method of fabrication thereof are manifestly capable of achieving the above enumerated objects and while preferred embodiments of the present invention have been disclosed, it will be appreciated that it is not limited thereto but may be otherwise embodied within the scope of the following claims.

What is claimed is:

1. A method of fabricating a plastic card comprising the steps of providing a sheet of plastic having a front surface and a rear surface, applying printing to said rear surface of said sheet of plastic, laminating a sheet of clear plastic to said rear surface of said sheet of plastic, polishing said front surface of said sheet of plastic, laminating a metal layer to said front surface of said sheet of plastic to provide a shiny front surface to said sheet of plastic, printing the shiny surface of said metal layer, and applying a protective coating in liquid form to said surface of said metal layer, said protective coating comprising a mixture of aminocoumarin dye and liquid polyvinyl chloride.

2. A method of fabricating a plastic card as set forth in claim 1 wherein protective coating is applied by a silk screen process.

3. A method of fabricating a plastic card as set forth in claim 1 wherein said mixture comprises about 0.01 ounce of said aminocoumarin dye in about one gallon of clear polyvinyl chloride liquid.

4. A method of fabricating a plastic card as set forth in claim 1 wherein said metal layer comprises vacuum metalized aluminum.

5. A method of fabricating a plastic card as set forth in claim 1 wherein said step of laminating said sheet of clear plastic to said rear surface of said sheet of plastic and said step of polishing said front surface of said sheet of plastic are performed simultaneously.

6. A method of fabricating a plastic card as set forth in claim 5 wherein both of said simultaneously performed steps comprise applying heat and pressure simultaneously to both said front surface and said rear surface.

7. A method of fabricating a plastic card as set forth in claim 6 wherein said metal layer comprises vacuum metalized aluminum.

8. A method of fabricating a plastic card as set forth in claim 1 including the step of hot stamping a magnetic foil strip to the rear surface of each of said cards.

9. A method of fabricating a laminate comprising the steps of providing a sheet of plastic having a front surface and a rear surface, laminating a metal layer to one of said surfaces of said sheet of plastic to provide a shiny surface to said sheet of plastic, applying a protective coating of a mixture liquid polyvinyl chloride and aminocoumarin dye to said surface of said metal layer, and curing said protective coating.

10. A method of fabricating a laminate as set forth in claim 9 wherein said metal layer comprises vacuum metalized aluminum.

11. A method of fabricating a laminate as set forth in claim 9 including the step of polishing said surface of said sheet of plastic prior to laminating said metal layer thereto.

12. A method of fabricating a laminate as set forth in claim 9 wherein said step of applying said protective coating is effected by a silk screen process.

13. A method of applying a mirrored surface to a plastic sheet comprising the steps of polishing the surface of said plastic sheet, adhering a metal layer to said surface, and applying a coating of a mixture of clear polyvinyl chloride ink and aminocoumarin dye to said metal layer, and curing said coating.

14. A method of fabricating a laminate as set forth in claim 13 wherein said mixture comprises about one gallon of clear polyvinyl chloride ink and 0.01 ounce of aminocoumarin dye.

15. A method of fabricating a plastic card comprising the steps of providing a sheet of plastic having a front surface and a rear surface, applying printing to said rear surface of said sheet of plastic, laminating a sheet of clear plastic to said rear surface of said sheet of plastic, polishing said front surface of said sheet of plastic, laminating a metal layer to said front surface of said sheet of plastic to provide a shiny front surface to said sheet of plastic, printing the shiny surface of said metal layer, applying a protective coating in liquid form to said surface of said metal layer, said metal layer comprising sheet vacuum metalized aluminum in roll form, and said step of laminating said metal layer to said front surface of said card comprising superimposing said sheet vacuum metalized aluminum relative to said front surface of said sheet of plastic, and applying heat and pressure to said superimposed sheet of vacuum metalized aluminum and said sheet of plastic.

* * * * *